United States Patent [19]

Fischer et al.

[11] Patent Number: 4,890,697
[45] Date of Patent: Jan. 2, 1990

[54] SENSING APPARATUS FOR MONITORING A STRUCTURE SUBJECT TO WEAR

[75] Inventors: Werner Fischer, Markt Schwaben; Friedrich Schauer, Heroldsberg; Kurt Kramer, Nuremberg, all of Fed. Rep. of Germany

[73] Assignee: Kabelmetal Electro GmbH, Hanover, Fed. Rep. of Germany

[21] Appl. No.: 278,357

[22] Filed: Dec. 1, 1988

[30] Foreign Application Priority Data

Dec. 19, 1987 [DE] Fed. Rep. of Germany ....... 3743254

[51] Int. Cl.$^4$ .............................................. F16D 66/02
[52] U.S. Cl. ..................................... 188/1.11; 340/454
[58] Field of Search ...................... 174/102 D, 122 G; 188/1.11; 340/52 A, 52 B

[56] References Cited

U.S. PATENT DOCUMENTS

| | | | |
|---|---|---|---|
| 2,207,579 | 7/1940 | Carl | 174/122 G X |
| 3,556,258 | 1/1971 | Winge et al. | 188/1.11 |
| 3,900,701 | 8/1975 | Bayles et al. | 174/122 G X |
| 4,016,533 | 4/1977 | Ishikawa et al. | 188/1.11 |
| 4,274,511 | 6/1981 | Moriya | 188/1.11 |
| 4,318,457 | 3/1982 | Dorsch et al. | 188/1.11 |
| 4,376,229 | 3/1983 | Maul et al. | 174/102 D X |
| 4,487,641 | 12/1984 | Bohannon et al. | 174/102 D X |

Primary Examiner—Duane A. Reger
Attorney, Agent, or Firm—James C. Jangarathis

[57] ABSTRACT

There is disclosed a sensing apparatus for monitoring a structure subject to wear, and providing an automatic indication upon the thickness of such structure being worn to a predetermined, minimum operable value. Such apparatus includes a sensing device that is insertable into a recess in one surface of structure to a depth corresponding to the predetermined minimum thickness; and a coaxial electrical cable including an inner conductor, a heat resistant covering, and an outer metallic tubular sheath that is preferably corrugated. One end of the coaxial cable is shaped as a loop and is positioned within the sensing device in the vicinity of the bottom face thereof, while the other end of the cable is connected to a contact assembly to which is connected a measuring circuit for automatically ascertaining the condition of the cable components within the sensing device.

9 Claims, 1 Drawing Sheet

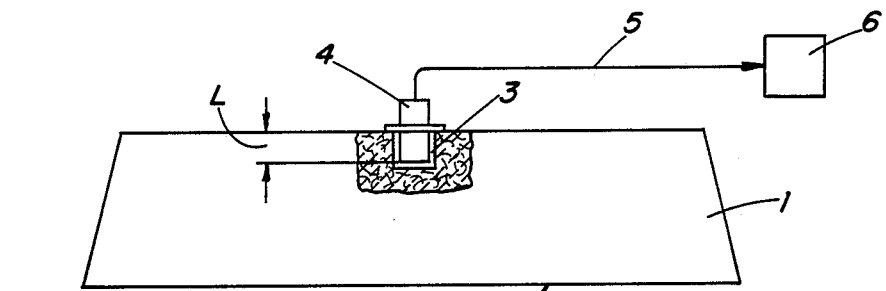
Fig.1
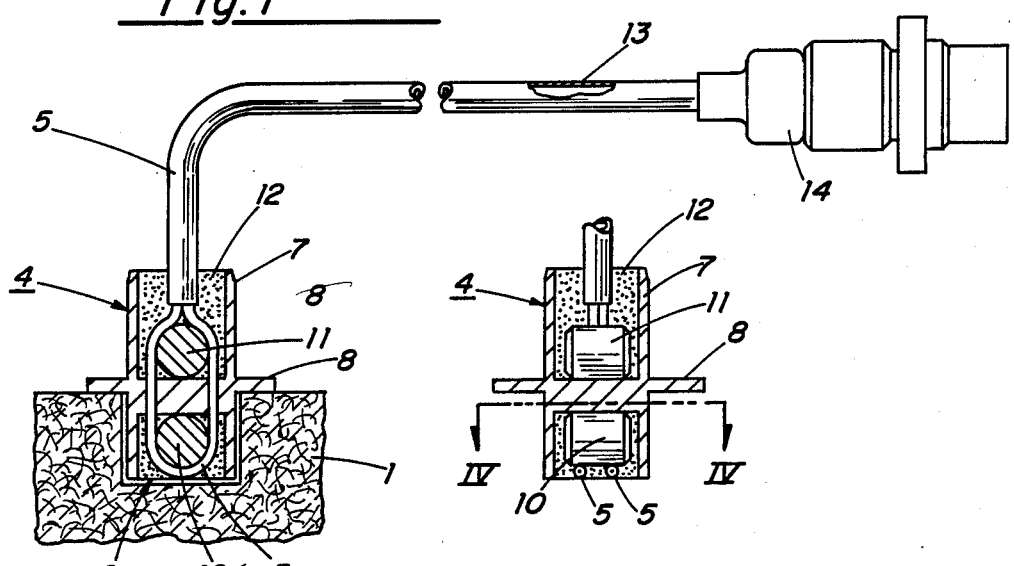
Fig.2
Fig.3
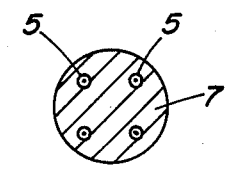
Fig.4
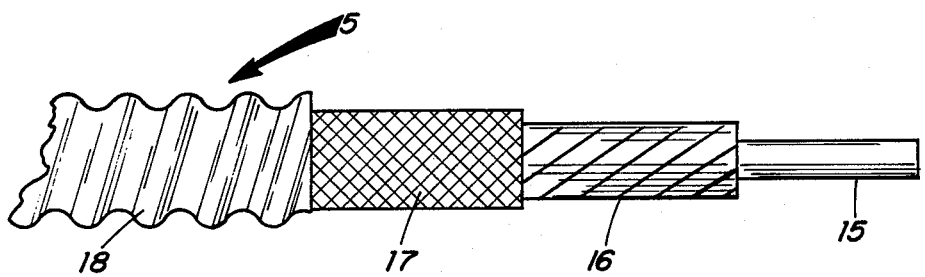
Fig.5

SENSING APPARATUS FOR MONITORING A STRUCTURE SUBJECT TO WEAR

The invention relates to a sensing apparatus for monitoring a structure subject to wear, and providing an automatic indication upon the thickness of such structure being worn to a predetermined, minimum operable condition.

BACKGROUND OF THE INVENTION

The invention relates to the prior art requirement for monitoring the operability of structures that are subject to repetitive frictional wear; for example, brake liners of motor vehicles and skids of magnetically suspended railroad cars. With each of such structures there is a need for a rapid indication of when such structure is so worn that efficient further operability is put in question. Such a condition is evidenced upon the thickness of such structure being reduced by the wear of an operable surface of such structure to a predetermined, minimum value.

With regard to magnetically suspended railroad cars, a minimum thickness of the skids is required under temperatures in excess of 700° C. Both the skids and any sensing devices employed to monitor the thickness of the skids must be so designed as to withstand extremely high temperatures.

OBJECT OF THE INVENTION

An object of the present invention is to provide a novel sensing apparatus for monitoring the thickness of a structure that is subject to wear.

Another object of the invention is to provide a sensing apparatus that remains operational under high temperatures and mechanical stress.

SUMMARY OF THE INVENTION

These and other objects of the present invention are achieved by a sensing apparatus comprising a sensing device, a coaxial electrical cable, and a measuring circuit. The sensing device is inserted into a recess in one surface of a structure to a depth that corresponds to a predetermined minimum thickness between such one surface and an opposite wearing surface. The coaxial electrical cable is comprised of an inner conductor, a heat resistant covering, and a metallic tubular outer sheath. One end of the cable is shaped in the form of a loop and is positioned within the sensing device in the vicinity of its end surface closest to the wearing, surface of the structure. The other end of the cable is connected to a contact assembly which is connectable to a measuring circuit that detects the electrical conditions within the sensing device.

The coaxial cable of the present invention includes the heat resistant covering to enable operability at extremely high temperatures, i.e., in excess of 700° C. Moreover, the metallic tubular outer sheath provides a gas-tight surrounding for such covering that prevents oxidation thereof, even at temperatures above 700° C.

The sensing device inserted as aforesaid noted provides a rapid and effective indication when the structure is worn down to a predetermined minimum thickness. More particularly, when such minimum thickness is realized the looped portion of the outer sheath positioned within the sensing device is eroded by frictional wear, and this results in a reduction of the capacitance of the coaxial line as detected by the measuring circuit. Such change in capacitance may be employed to trigger an alarm. The sensing device provides a further indication when further reduction of the thickness of the structure causes a break in the heat resistant covering adjacent to such looped portion. Under such further condition, an electrical short occurs between the inner conductor and the outer sheath.

BRIEF DESCRIPTION OF THE DRAWINGS

A better understanding of the present invention as well as the objects and advantages thereof will become apparent upon consideration of the following detailed disclosure thereof, especially when taken with the accompanying drawings, wherein:

FIG. 1 is a schematic representation of a sensing apparatus that comprises a sensing device a portion of which is inserted into one surface of a brake liner.

FIG. 2 includes an enlarged, sectional view of the sensing device of FIG. 1.

FIG. 3 is an enlarged, sectional view of an alternate sensing device that may be employed in the apparatus of FIG. 1.

FIG. 4 is a sectional view through line IV—IV of FIG. 3.

FIG. 5 is a schematic representation of a coaxial electrical cable employed in the sensing apparatus of FIG. 1.

Referring to FIGS. 1 and 2, a brake liner 1 is depicted as an exemplary structure that is subject to frictional wear of a surface 2 thereof. On the surface of brake liner 1 opposite to the wearing surface 2, there is provided a recess 3 in which is inserted a sensing device 4. The sensing device 4 is connected through a coaxial electrical cable 5 to a measuring circuit 6. The sensing device 4 includes a mechanically stable and temperature resistant housing 7 having a flange 8 that is positioned on the top surface of the brake liner 1. As indicated in FIG. 1, a length "L" between the top surface of the brake liner 1 to a bottom surface 9 of the housing 7, corresponds to a minimum operable thickness of the brake liner 1.

One end of a coaxial electrical cable 5 is positioned within the housing 7 of the sensing device 4. More particularly, such one end of the cable 5 is formed into a loop and so disposed as to extend into the area of the bottom surface 9 of the housing 7. For mechanical stabilization such end of the cable 5 is formed about a cylindrical support element 10 that is positioned in the vicinity of the bottom surface 9 and extends into the perimeter surfaces defining the recess 3 of the brake liner 1. Additionally, a cylindrical support element 11 is positioned within the housing 7 above the flange 8, and extends through the loop portion of the end of cable 5 for further mechanical stabilization. The housing 7 is filled with a moisture and temperature resistant material 12. The portion of the cable 5 extending from the housing 7 of the sensing device 4 to a contact assembly 14 is surrounded by a protective jacket 13 of plastic material. The contact assembly 14 and the protective jacket 13 are joined, for example, by injection molding to assure a hermetic seal; while the portion of protective jack 13 in the vicinity of the sensing device 4, extends into the filler material 12 to also assure a hermetic seal. The measuring circuit 6 includes at its input the contact assembly 14 for achieving an electrical continuity to the elements of the looped portion of the cable 5 within the sensing device 4.

FIG. 3 illustrates an alternative embodiment of the elements of the instant invention wherein two coaxial electrical cables 5 are disposed side by side in a housing 7, such cables being formed identically and being connected to a contact assembly 14 as aforesaid described. The use of the two cables 5 is for redundancy, i.e., the sensing device 4 remains operative even when one of the two cables 5 fails. As illustrated in the sectional view of FIG. 4, the two cables 5 extend parallel with respect to each other within the housing 7.

With reference to FIG. 5, the coaxial electrical cable 5 has an inner conductor 15 comprised of nickel-plated copper. A heat resistant band 16 is wrapped about the conductor 15 in an overlapping sequence, and a glass fiber mesh 17 is tightly positioned circumferentially about the band 16, thus insulating the conductor 15 against temperatures in excess of 700° C. The conductor 15 so insulated is positioned within a longitudinally welded, tubular sheath 18 that snugly engages the glass fiber mesh 17 upon being corrugated thereinto. The corrugated sheath 18 not only provides an effective mechanical protection of the insulated conductor 15 but, also, provides improved flexibility for dealing with frequent changes of high temperatures, while retaining a hermetic isolation of the conductor 15 from the immediate environment.

The coaxial electrical cable 5 of FIG. 5 is manufactured by the steps of continuously drawing the inner conductor 15 in a longitudinal direction through a wrapping station that applies the heat resistant band 16 circumferentially about the conductor 15, and then through a meshing station for applying the glass fiber mesh 17 in a snug fitting manner around the band 16. Concurrently, in a priorly known manner, a metal strip is continuously drawn in a longitudinal direction through a plurality of forming rollers to form a hollow tubular member concentrically about the glass fiber mesh 17. The longitudinal abutting edges of the tubular member are continuously welded to form a fluid-tight welded longitudinal seam. Downstream of such welding, the tubular member is longitudinally drawn through a corrugating station that corrugates the tubular sheath 18 as depicted in FIG. 5, the troughs of the corrugations of tubular sheath 18 slightly engaging the glass fiber mesh 17 in a manner to avoid damage thereto.

The manner of employment of the sensing apparatus of the present invention will be apparent from the following operational description:

As long as the thickness of the brake liner 1 is greater than "L", the sensing device 4 is not effected by the wearing of the surface 2. When the frictional wear on the surface 2 erodes same to the extent that only the minimum wall thickness "L" remains, the sensing device 4 is activated with the next braking action of the brake liner 1. Upon such next braking action, the portion of the tubular sheath 18 of the coaxial electrical cable 5, located adjacent to the bottom surface 9 of the housing 7, is eroded and this causes a capacitance change between the inner conductor 15 and the tubular sheath 18 of the cable 5. This capacitance change is evaluated by the measuring circuit 6 as a signal calling for a replacement of the brake liner 1. A replacement of the brake liner 1 is mandatory once the erosion of surface 2 becomes so acute that the heat resistant band 16 and the inner conductor 15 separate, giving rise to a short condition between the inner conductor 15 and the tubular sheath 18.

While the invention has been described in connection with an exemplary embodiment thereof, it will be understood that many modifications will be apparent to those of ordinary skill in the art and that this application is intended to cover any adaptations or variations thereof. Therefore, it is manifestly intended that the invention be only limited by the claims and equivalents thereof.

What is claimed:

1. A sensing apparatus for monitoring a structure subject to wear, comprising:

a sensing device insertable into a recess in one surface of said structure, said sensing device having at least a portion of its length that corresponds to a predetermined minimum thickness between said one surface and an opposite surface of said structure;

a first coaxial electrical cable comprising an inner conductor, a heat resistant means positioned about said inner conductor, and a metallic tubular sheath positioned about said heat resistant means, an end of said first coaxial cable extending into said sensing device so as to dispose an end portion thereof into an area of an end face of said sensing device, said end portion of said coaxial electrical cable being formed into a loop having a tubular sheath portion an outer surface of which is adjacent to said end face of said sensing device, and an inner conductor portion disposed within said sensing device; and a contact means connected to the other end of said first coaxial electrical cable so as to make electrical contact with said inner conductor and electrical contact with said tubular sheath, said contact means including a measuring circuit for detecting the electrical characteristics between said inner conductor and said tubular sheath.

2. Apparatus in accordance with claim 1, wherein said metallic tubular sheath is corrugated.

3. Apparatus in accordance with claim 1, wherein said sensing device further includes a cylindrical support element around which said other end of said first coaxial electrical cable is positioned.

4. Apparatus in accordance with claim 1, wherein said sensing device further includes a mechanically stable, temperature resistant housing whose hollow spaces are filled with temperature resistant filler material.

5. Apparatus in accordance with claim 1, wherein said contact means includes a contact assembly the contacts of which are connected to said other end of said first coaxial electrical cable within a fluid-tight environment.

6. Apparatus in accordance with claim 4, further comprising a fluid-tight protective jacket formed about said first coaxial electrical cable, and having a first end of which extends into said filler material.

7. Apparatus in accordance with claim 5, further comprising a fluid-tight protective jacket formed about said first coaxial electrical cable, and having a second end of which extends into said contact assembly to form a fluid-tight seal therewith.

8. Apparatus in accordance with claim 1, further comprising a second coaxial electrical cable similar in construction to said first coaxial electrical cable, one end of said second coaxial cable being connected to said contact means, and the other end of said second electrical cable being also shaped in the form of a loop and being positioned within said sensing device, side by side, with respect to said loop of said first coaxial electrical cable.

9. Apparatus in accordance with claim 1, wherein said inner conductor is comprised of nickel-plated copper; said heat resistant means is comprised of a heat resistant band wrapped about said inner conductor, and a glass fiber mesh tightly positioned circumferentially about said wrapped, heat resistant band; and said metallic tubular sheath is corrugated, with the troughs of the corrugations engaging said glass fiber mesh.

* * * * *

UNITED STATES PATENT AND TRADEMARK OFFICE
CERTIFICATE OF CORRECTION

PATENT NO. : 4,890,697

DATED : January 2, 1990

INVENTOR(S) : Werner Fischer, et al

It is certified that error appears in the above-identified patent and that said Letters Patent is hereby corrected as shown below:

On the title page item

"[73] Assignee: Kabelmetal Electro GmbH,
Hanover, Fed. Rep. of Germany";

to

--[73] Co-assignees: Kabelmetal Electro GmbH,
Hannover, Fed. Rep. of Germany;
and Thyssen Industries AG, Essen,
Fed. Rep. of Germany--

Signed and Sealed this

Nineteenth Day of November, 1991

*Attest:*

HARRY F. MANBECK, JR.

*Attesting Officer*   *Commissioner of Patents and Trademarks*